United States Patent [19]

Rolf et al.

[11] Patent Number: 4,564,680
[45] Date of Patent: Jan. 14, 1986

[54] ISOINDOLAZINES

[75] Inventors: Meinhard Rolf; Rütger Neeff; Walter Müller, all of Leverkusen; Volker Hederich, Cologne, all of Fed. Rep. of Germany

[73] Assignee: Bayer Aktiengesellschaft, Leverkusen, Fed. Rep. of Germany

[21] Appl. No.: 519,792

[22] Filed: Aug. 3, 1983

[30] Foreign Application Priority Data

Aug. 10, 1982 [DE] Fed. Rep. of Germany ....... 3229733

[51] Int. Cl.[4] ............................................. C09B 57/04
[52] U.S. Cl. ..................................... 546/155; 106/23; 106/288 Q; 524/92; 524/102; 544/284; 544/300; 548/159; 548/183; 548/202; 548/217; 548/305; 548/327; 548/374; 548/455
[58] Field of Search ................ 544/284, 300; 548/455, 548/159, 183, 202, 217, 305, 327, 374; 546/155

[56] References Cited

U.S. PATENT DOCUMENTS

| | | | |
|---|---|---|---|
| 3,646,033 | 2/1972 | Leister et al. | 544/284 |
| 3,794,659 | 2/1974 | Leister et al. | 548/159 |
| 4,022,770 | 5/1977 | L'Eplattenier et al. | 544/284 |
| 4,111,947 | 9/1978 | L'Eplattenier et al. | 548/108 |
| 4,237,286 | 12/1980 | L'Eplattenier et al. | 544/225 |
| 4,237,292 | 12/1980 | L'Eplattenier et al. | 546/7 |
| 4,237,293 | 12/1980 | L'Eplattenier et al. | 546/7 |

FOREIGN PATENT DOCUMENTS

| | | |
|---|---|---|
| 0036387 | 3/1981 | European Pat. Off. |
| 2142245 | 3/1973 | Fed. Rep. of Germany . |
| 2321511 | 7/1974 | Fed. Rep. of Germany . |
| 2504321 | 8/1975 | Fed. Rep. of Germany . |

1537299 7/1968 France .

*Primary Examiner*—Donald G. Daus
*Assistant Examiner*—Stephen M. Kapner
*Attorney, Agent, or Firm*—Sprung Horn Kramer & Woods

[57] ABSTRACT

Isoindolazines which, in one of their tautomeric structures, have the formula

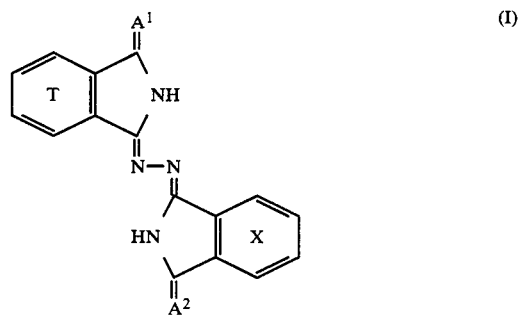

where
the rings designated X and T can be substituted and
$A^1$ and $A^2$ represent the divalent radical of a compound having two replaceable hydrogen atoms on a C or N atom, in particular the divalent radical of an active methylene compound, of an amine, of a hydrazine, of a hydrazide or of a hydrazone,
salts and complexes of these compounds, processes for their preparation, and their use as pigments.

5 Claims, No Drawings

ISOINDOLAZINES

The invention relates to isoindolazines which, in one of their tautomeric structures, have the formula

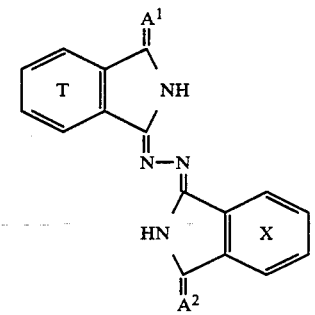

(I)

to their salts and complexes, to processes for preparing these compounds, and to their use.

The rings designated X and T in the formula (I) can be substituted.

$A^1$ and $A^2$ represent the divalent radical of a compound having two replaceable hydrogen atoms on a C or N atom, in particular the divalent radical of an active methylene compound, of an amine, of a hydrazine, of a hydrazide or of a hydrazone.

The rings X and T can carry, for example, 1,2,3- or 4-substituents from the series comprising halogen, in particular chlorine or bromine, $C_1$-$C_6$-alkyl, in particular methyl or ethyl, $C_1$-$C_6$-alkoxy, in particular methoxy or ethoxy, carboxyl, nitro and carbamoyl.

The divalent radicals $A^1$ and $A^2$ can be derived from an active methylene compound of the formula $$CNCH_2R^1 \qquad (II)$$

wherein $R^1$ denotes a radical which activates the methylene group, for example cyano, $C_1$-$C_6$-alkoxy-$C_1$-$C_6$-alkoxycarbonyl, carbamoyl which is optionally substituted by $C_1$-$C_6$-alkyl, benzyl, naphthyl or phenyl, where phenyl, benzyl and naphthyl can be substituted, for example by chlorine, bromine, $C_1$-$C_6$-alkyl, $C_1$-$C_6$-alkoxy, nitro, trifluoromethyl, $C_1$-$C_6$-alkoxycarbonyl, in particular acetyl, cyano, $C_1$-$C_6$-alkylamino, benzoylamino, phthalimidyl or carbamoyl, $C_1$-$C_6$-alkylcarbonyl, in particular acetyl; benzoyl, $C_1$-$C_6$-alkoxycarbonyl, benzyloxycarbonyl or phenoxycarbonyl, where benzoyl, benzyl and phenoxy can be substituted, for example by halogen, such as chlorine or bromine, nitro, $C_1$-$C_6$-alkyl, acylamino, in particular $C_1$-$C_6$-alkylcarbonylamino, or phthalimidyl; or phenyl which is optionally substituted by halogen, in particular chlorine or bromine, nitro, cyano or trifluoromethyl.

$R^1$ can also represent a heterocyclic radical of the formula

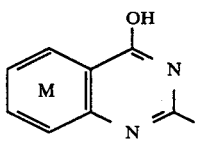

(III)

in which Y represents the remaining members of a 5- or 6-membered ring which optionally contains further heteroatoms. Examples of heterocyclic radicals $R^1$ are:

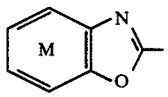

(IV)

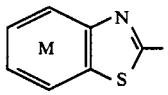

(V)

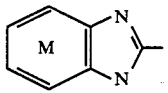

(VI)

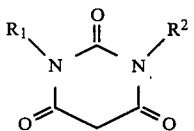

(VII)

The rings designated M in the formulae (IV)–(VII) can be substituted, for example by halogen, preferably chlorine or bromine, nitro, $C_1$-$C_6$-alkyl, preferably methyl or ethyl, or $C_1$-$C_6$-alkoxy, preferably methoxy or ethoxy.

The radicals $A^1$ and $A^2$ can also be derived from cyclic active methylene compounds of, for example, the following formulae:

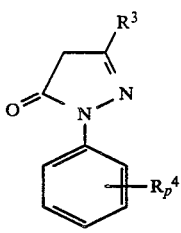

(VIII)

(IX)

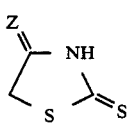

(X)

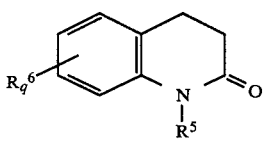

(XI)

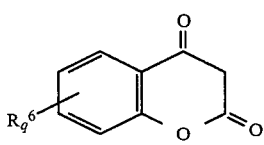

(XIa)

where, in the formulae VIII–XIa, for example $R^1$ and $R^2$ designate hydrogen, $C_1$–$C_6$-alkyl, phenyl which is optionally substituted by halogen, such as chlorine or bromine, $C_1$–$C_6$-alkyl, $C_1$–$C_6$-alkoxy or nitro, or α- or β-naphthyl, $R^3$ designates $C_1$–$C_6$-alkyl, preferably methyl, amino, $C_1$–$C_6$-alkylcarbonyl, carbamoyl or $C_1$–$C_6$-alkoxycarbonyl, $R^4$ designates $C_1$–$C_6$-alkyl, $C_1$–$C_6$-alkoxy, halogen, preferably chlorine, or nitro, p designates 0, 1 or 2, Z designates O or S, $R^5$ designates hydrogen or $C_1$–$C_6$-alkyl, preferably methyl;

$R^6$ designates halogen, preferably chlorine, or nitro and q designates 0, 1, 2, 3 or 4.

If $A^1$ and/or $A^2$ represent the radical of an amine, it is preferably an amine of the formula $$R^7\text{—}NH_2 \qquad (XII)$$

in which $R^7$ represents a phenyl radical which is optionally at most trisubstituted by halogen, such as chlorine or bromine, nitro, cyano, carbamoyl, trifluoromethyl, phthalimidyl, $C_1$–$C_6$-alkylcarbonylamino, preferably acetylamino, or benzoylamino which in turn can be further substituted by chlorine, $C_1$–$C_6$-alkyl, preferably methyl, or nitro, α- or β-naphthyl or a radical of the formulae (XIII)

(XIV)

(XV)

(XVI)

where T has the abovementioned meaning.

Suitable hydrazine radicals $A^1$ and/or $A^2$ are preferably derived from hydrazines of the formula $$R^7\text{—}NH\text{—}NH_2 \qquad (XVII)$$

in which $R^7$ has the meaning assigned in the formula (XII).

$A^1$ and/or $A^2$ in the formula (I) also represent a hydrazide of the formula $$R^8\text{—}NH\text{—}NH_2 \qquad (XVIII)$$

in which $R^8$ preferably designates $C_1$–$C_6$-alkylcarbonyl or benzoyl which is optionally substituted by halogen, such as chlorine or bromine, nitro, cyano, carbamoyl, $C_1$–$C_6$-alkylcarbonylamino, preferably acetylamino, benzoylamino or phthalimidyl.

$A^1$ and/or $A^2$ can finally derive from a hydrazone of the formula $$R^9\text{—}\overset{\overset{\displaystyle R^{10}}{|}}{CH}=N\text{—}NH_2 \qquad (XIX)$$

in which $R^9$ preferably represents hydrogen or $C_1$–$C_6$-alkyl and $R^{10}$ preferably represents phenyl which is optionally substituted by chlorine, nitro, $C_1$–$C_6$-alkyl, $C_1$–$C_6$-alkylcarbonylamino, preferably acetyl, phthalimidyl, cyano, carbamoyl or trifluoromethyl or a heterocyclic radical of the formula (XIX)

in which M has the abovementioned meaning.

Preferred compounds, in one of their tautomeric structures, have the formula (XX)

in which $A^3$ and $A^4$ can assume the following meanings:

where $R^{11}$ designates cyano, carbamoyl, $C_1$-$C_4$-alkylcarbamoyl, phenylcarbamoyl, where phenyl can be further substituted by chlorine, $C_1$-$C_4$-alkyl, nitro or $C_1$-$C_4$-alkoxy, $C_1$-$C_4$-alkoxycarbamoyl,

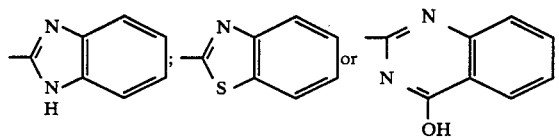

$R^{12}$ designates hydrogen or $C_1$-$C_4$-alkyl,
$R^{13}$ designates methyl, ethoxycarbonyl or amino,
$R^{14}$ designates chlorine, methyl or nitro, and
$R^{15}$ designates hydrogen or methyl.

Particularly preferred compounds have the formula

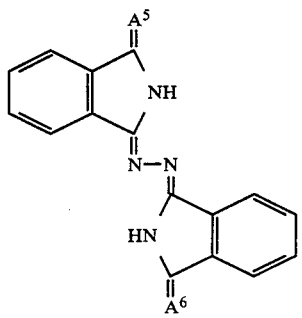

in which $A^5$ and $A^6$ have the following meanings

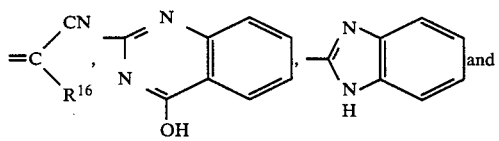

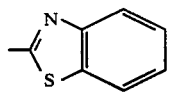

where $R^{16}$ represents cyano, carbamoyl, methylcarbamoyl or ethylcarbamoyl.

Within the scope of the present invention also those compounds of the formula (I) are of particular interest where $A^1$ and $A^2$ are identical.

The salts and complexes of compounds of the formula (I) are preferably Ni, Zn, Cr, Fe, Cu, Co, Mn, Ba, Sr, Ca or Cd compounds.

There are several possible methods of preparing the compounds of the formula (I).

1.

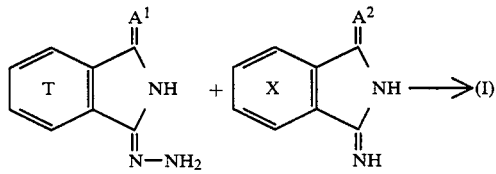

Condensation of the hydrazino compounds (XXI) with the imine (XXII) where $A^1$, $A^2$, X and T have the abovementioned meaning proceeds via the elimination of ammonia and gives the symmetrical or unsymmetrial dimers (I).

The reaction is advantageously carried out in the presence of an acid in an organic solvent at temperatures between 20° and 150° C., preferably between 50° and 120° C.

Suitable organic solvents are alcohols, such as methanol, ethanol, amyl alcohol or glycol monoalkyl ethers, aromatics, such as chlorobenzene, nitrobenzene or toluene, amidic solvents, such as formamide, dimethylformamide or N-methylpyrrolidone, or acids, such as formic or acetic acid.

Suitable acids are inorganic acids, such as hydrochloric acid, sulphuric acid or phosphoric acid, or organic acids, such as formic acid, acetic acid, chloroacetic acid, dichloroacetic acid, oxalic acid, benzenesulphonic acid, p-toluenesulphonic acid or oxalic acid.

2.

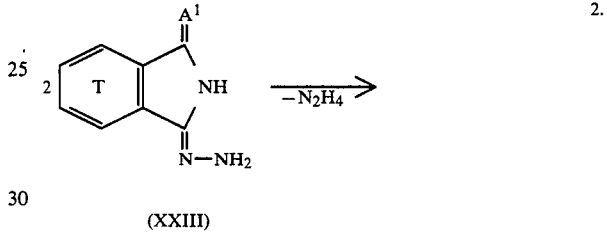

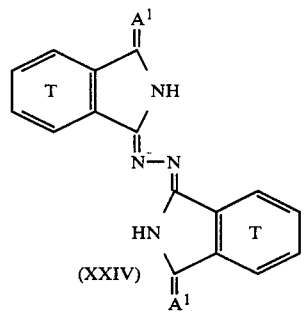

Acid dimerisation of the hydrazine (XXIII), which proceeds via the elimination of hydrazine, gives the pigments (XXIV).

The starting material (XXIII) need not be used in the reaction in the pure state but can also be used in any desired ratio in a mixture with the hydrazine (XXV)

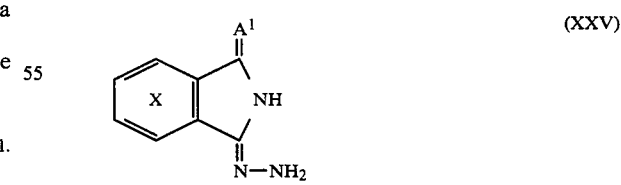

This then gives the corresponding mixed dimers.

In the same way the mixed condensation can be performed with hydrazines which are analogous to (XXIII) and (XXV) but have radicals $A^2$ which are different from $A^1$.

The azine synthesis by dimerising 2 mols of hydrazone have been described in the literature. It is advantageously carried out under acid conditions at elevated temperatures. For example, the reaction can be carried out in an organic solvent in the presence of at least 1 mol equivalent of such an acid as described under 1. The reaction is advantageously carried out at 80°–200° C., if appropriate under pressure. In addition, the dimerisation can also be carried out in inorganic acids, for example polyphosphoric acid.

3. By acid dimerisation of the alkoxymethylene hydrazines (XXVI) to (XXIX), optionally in mixtures with each other, under the reaction conditions given for the free hydrazines (XXIII) and XXV)

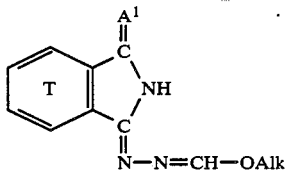

XXVI

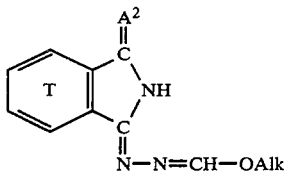

XXVII

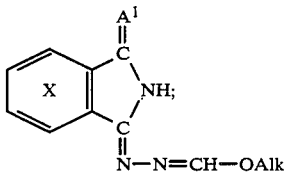

XXVIII

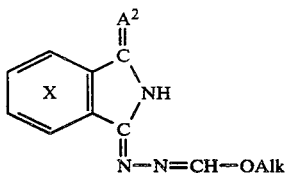

XXIX

Alk designates $C_1$–$C_6$-alkyl, preferably ethyl.

4. By dimerisation of the alkoxymethylene hydrazines (XXVI) to (XXIX) in the presence of methylene active compounds.

The reaction is advantageously carried out in an inert organic solvent at temperatures between 50° and 180° C., preferably between 80° and 130° C.

Suitable solvents are ethyleneglycolmonoalkylether, dimethylformamide, dimethylacetamide, N-methylpyrrolidone, dimethylsulfoxide or sulfolane.

Suitable methylene active compounds are represented by formula (II) and (VIII) to (XIa).

The reaction between the alkoxymethylenehydrazine compound and the methylene active compound is preferably carried out in a molar ratio of 1:1, an excess of the methylene compound being not detrimental.

5. Compounds of the formula (I) are further obtained by the reaction of the imine (XXI) with hydrazine.

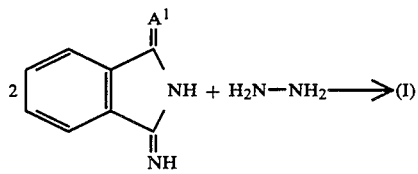

The reaction is advantageously carried out in a solvent under acidic conditions at temperatures between 40° and 160° C. Hydrazine can be employed in the form of the free base or as a salt, for example the chloride or the sulphate. Suitable solvents are water, alcohols, such as methanol, ethanol, n-butanol, glycol or glycol ethers, such as ethyleneglycolmonomethylether, ethyleneglycolmonoethylether, ethyleneglycoldimethylether, organic acids, such as formic acid, acetic acid, propionic acid, aromatics, such as toluene, o-xylene, chlorobenzene, 1,2-dichlorobenzene, 1,3-dichlorobenzene, nitrobenzene, amidic solvents, such as dimethylformamide, N-methylpyrrolidone, dimethylacetamide, dimethylsulfoxide or tetramethylene sulfone.

Suitable acids to provide for the acidic reaction medium are anorganic acids, such as hydrochloric acid, sulphuric acid, phosphoric acid or organic acids, such as formic acid, acetic acid, chloroacetic acid, dichloroacetic acid, oxalic acid, benzenesulphonic acid, p-toluenesulphonic acid.

Salts and complexes of compounds of the formula (I) are prepared by methods which are in themselves known, for example by heating the compounds together with appropriate metal salts for some time (about 5–10 hours) at elevated temperatures (about 140° C.) in dimethylformamide, N-methylpyrrolidone or formamide.

Compounds of the formula (I) are obtained in a form which is suitable for application as pigment or they can be converted into a suitable form by aftertreatment methods which are in themselves known, for example by dissolving or swelling the compounds in a strong inorganic acid, such as sulphuric acid, and discharging the mixture onto ice. They can also be finely divided by milling them with or without milling aids such as inorganic salts or sand, if appropriate in the presence of solvents, such as toluene, xylene, dichlorobenzene or N-methylpyrrolidone. The tinctorial strength and transparency of the pigment can be affected by varying the aftertreatment.

Owing to their light and migration fastness, colourants of the formula (I) are suitable for many different pigment applications. For instance, they can be used for preparing very fast-pigmented systems, such as mixtures with other materials, formulations, paints, printing ink, coloured paper or coloured macromolecular materials. Mixtures with other materials can be understood as meaning, for example, those with inorganic white pigments such as titanium dioxide (rutile) or with cement. Examples of formulations are flushed pastes with organic liquids or pastes and dispersions with water, dispersants and, if appropriate, preservatives. The term paint covers, for example, physically or oxidatively drying lacquers, stoving enamels, reactive paints, two-component paints, emulsion paints for weatherproof coatings and distempers. Printing inks are understood as meaning those for paper, textile and tin-plate printing. The macromolecular substances can be of natural origin, such as rubber, can have been obtained by chemical modification, such as acetylcellulose, cellulose butyrate or viscose, or be synthetically produced, like polymers, polyaddition products and polycondensates. Examples which may be mentioned are plastic materials, such as polyvinyl chloride, polyvinyl acetate, polyvinyl propionate, polyolefines, for example polyethylene, polyamides, high molecular weight polyamides, polymers and copolymers of acrylates, methacrylates, acrylonitrile, acrylamide, butadiene or styrene, polyurethanes and polycarbonates. The materials pigmented with the products claimed can be in any desired shape or form.

Pigments of the formula (I) are also highly water-resistant, oil-resistant, acid-resistant, lime-resistant, alkali-resistant, solvent-resistant, fast to over-lacquering, fast to over-spraying, fast to sublimation, heat-resistant and resistant to vulcanising, give a very good yield and are readily dispersible in plastic materials.

EXAMPLE 1

(a) 30 g of 1-hydrazino-3-(cyano-N-phenylcarbamoylmethylene)-isoindolenine are added to a mixture of 300 ml of dimethylformamide and 10 ml of 96% strength sulphuric acid, and the mixture is stirred at 130° C. for 30 minutes. The resulting precipitate is filtered off hot with suction, washed with dimethylformamide and methanol, and dried to give 21 g (74% of theory) of a reddish orange substance of the structure

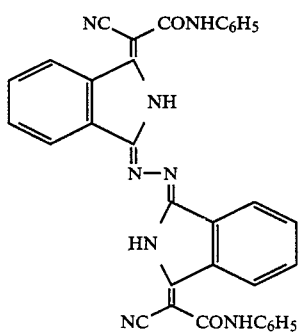

Similar results are obtained when sulphuric acid is replaced by other acids, such as phosphoric acid, hydrochloric acid, dichloroacetic acid or acetic acid.

(b) 10 g of 1-hydrazino-3-(cyano-N-phenylcarbamoylmethylene)isoindolenine and 9.5 g of 1-amino-3-(cyano-N-phenylcarbamoylmethylene)-isoindolenine are added to a mixture of 200 ml of dimethylformamide and 15 ml of glacial acetic acid, and the mixture is stirred at 140° C. for 2 hours. The resulting precipitate is filtered off hot with suction, thoroughly washed with dimethylformamide and methanol, and dried to give 13 g (68% of theory) of a compound which, spectroscopically, is identical to the material obtained in Example 1a but has slightly different colouristic properties.

EXAMPLE 2

15 g of 1-hydrazino-3-(cyanocarbamoylmethylene)isoindolenine are added to a mixture of 200 ml of dimethylformamide and 10 ml of 96% strength sulphuric acid, and the mixture is stirred at 80° C. for 1 hour under nitrogen. The resulting precipitate is filtered off hot with suction, thoroughly washed with dimethylformamide and methanol, and dried to give 9.8 g (70% of theory) of a strong yellow pigment of the formula

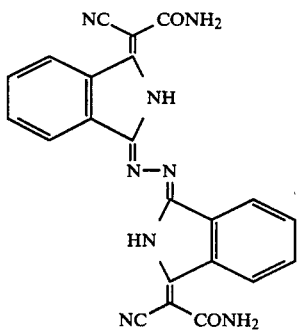

EXAMPLE 3

(a) 20 g of 1-amino-3-(cyano-N-methylcarbamoylmethylene)-isoindolenine are added to a mixture of 300 ml of dimethylformamide and 20 ml of acetic acid, and 5.5 g of hydrazine hydrate (125% of theory) are slowly added at 25° C. under nitrogen.

10 ml of sulphuric acid (96%) are added after 2 hours at 40° C., and the mixture is stirred at 140° C. for 1 hour. The product is isolated in the customary manner to give 15.2 g (82% of theory) of a reddish yellow pigment of the formula

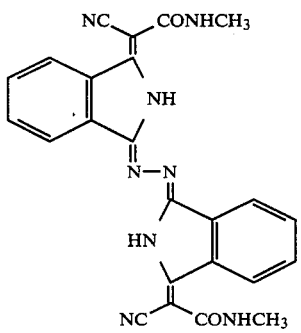

(b) 13 g of 1-amino-3-(cyano-N-methylcarbamoylmethylene)isoindolenine are added to a mixture of 120 ml of nitrobenzene and 10 ml of glacial acetic acid, and 2 ml of hydrazine hydrate are added at 110° C. The mixture is stirred at 110° C. for 2 hours, filtered with suction and washed. There are obtained 11.7 g (90% of theory) of a red-dish yellow pigment of the formula given in Example (3a).

Using the hydrazones listed as starting materials in the table below, the process described in Example 1a gives the corresponding dimers which have the indicated shades.

| Example No. | Starting material | Shade of the resulting pigment |
|---|---|---|
| 4 | 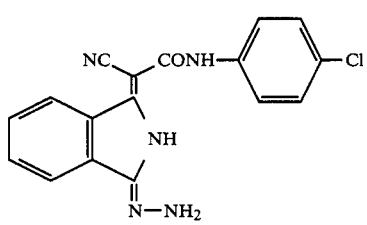 | red |

4,564,680
-continued
| Example No. | Starting material | Shade of the resulting pigment |
|---|---|---|
| 5 | 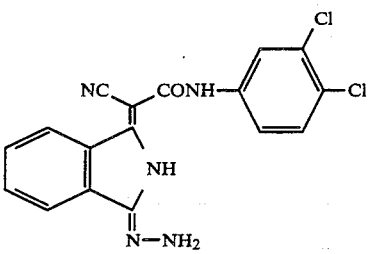 | red |
| 6 | 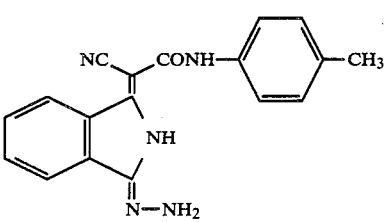 | red |
| 7 | 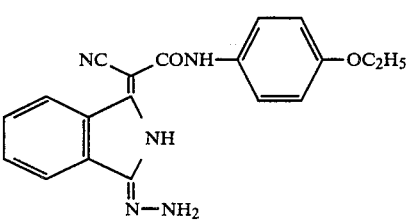 | red |
| 8 | 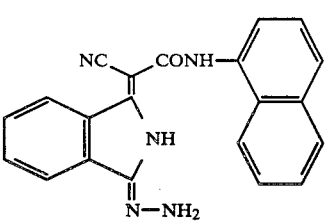 | yellow |
| 9 | 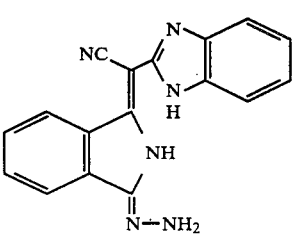 | red |
| 10 | 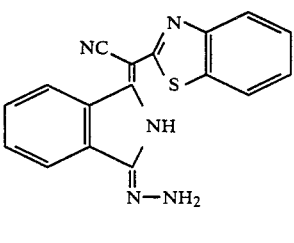 | red |
-continued
| Example No. | Starting material | Shade of the resulting pigment |
|---|---|---|
| 11 | 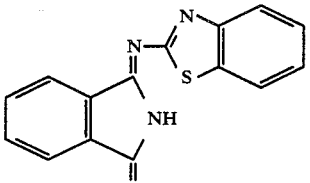 | orange |
| 12 | 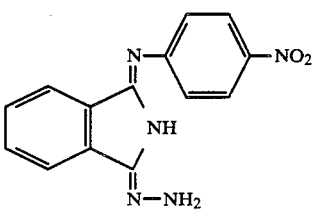 | orange |
| 13 | 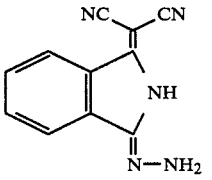 | yellow |
| 14 | 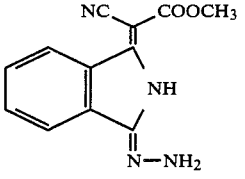 | yellow |
| 15 | 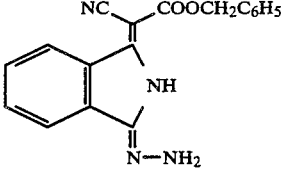 | yellow |
| 16 | 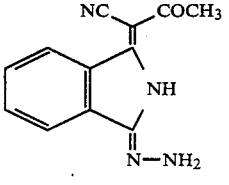 | yellow |
| 17 | 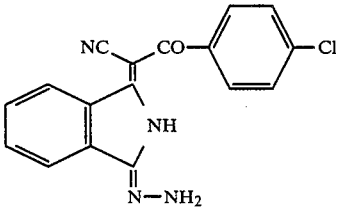 | yellow |

-continued

| Example No. | Starting material | Shade of the resulting pigment |
|---|---|---|
| 18 | (structure) | orange |
| 19 | (structure) | orange |
| 20 | (structure) | brown |
| 21 | (structure) | orange |
| 22 | (structure) | orange |
| 23 | (structure) | brown |
| 24 | (structure) | brown |
| 25 | (structure) | red |
| 26 | (structure) | red |
| 27 | (structure) | red |
| 28 | (structure) | red |

| Example No. | Starting material | Shade of the resulting pigment |
|---|---|---|
| 29 | 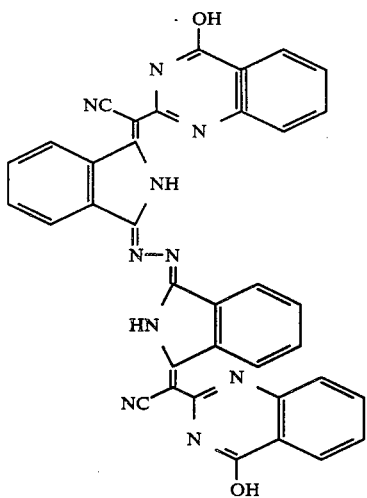 (structure with NC, CONHCH₃, NH, N—NH₂, O₂N) | orange |
| 30 | (structure with NC, CONH₂, NH, N—NH₂, H₂NOC) | orange |

EXAMPLE 31

12 g of 1-hydrazino-3-(cyanoquinazolinonyl-2-methylene)-isoindolenine are added to a mixture of 100 ml of dimethylformamide and 8 ml of sulphuric acid (96%), and the mixture is stirred at 130° C. for 15 minutes. Filtering with suction and washing gives 8.0 g (70% of theory) of a red pigment of the formula

EXAMPLE 32

24.1 g (0.1 mol) of 1-hydrazino-3-(cyano-N-methylcarbamoylmethylene)-isoindolenine and 30.3 g (0.1 mol) of 1-hydrazino-3-(cyano-N-phenylcarbamoylmethylene)-isoindolenine are added to a mixture of 300 ml of dimethylformamide and 10 ml of sulphuric acid (96%). The orange precipitate is filtered off after one hour at 140° C. and gives on washing and drying 38 g (74% of theory) of a pigment mixture of the structure

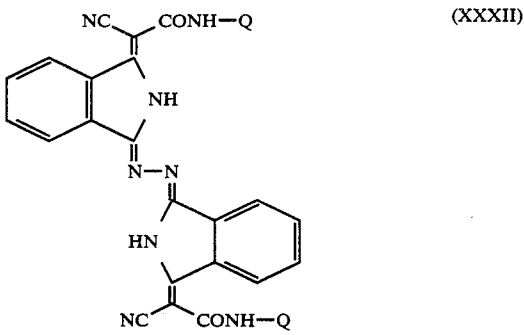

(XXXII)

where, on a random basis, 50% of the radicals Q in each molecule denote methyl and the remaining 50% denote phenyl.

EXAMPLE 33

9.1 g (0.03 mol) of 1-hydrazino-3-(cyano-N-phenylcarbamoylmethylene)-isoiondolenine and 7.7 g (0.03 mol) of 1-amino-3-(2,4,6-trioxopyrimidinyl)isoindolenine are heated under reflux for 1¾ hours in a mixture of 120 ml of dimethylformamide and 8 ml of glacial acetic acid. There are obtained 12.2 g (75% of theory) of a reddish orange pigment of the formula

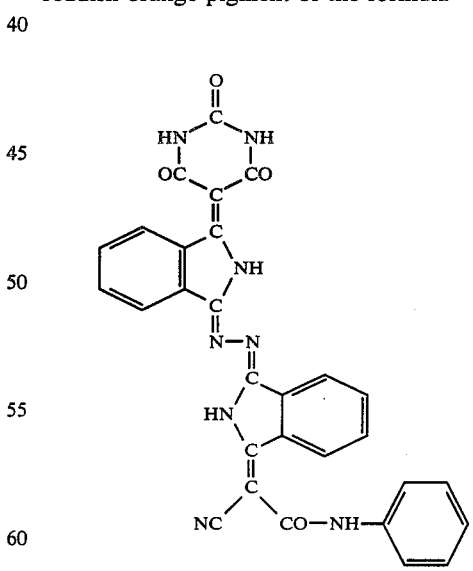

Using the starting material listed in the following table, the process described in Example 33 gives the corresponding unsymmetrical isoindolazines which have the indicated shades.

| Example No. | Starting materials | | Shade of resulting pigment |
|---|---|---|---|
| | Hydrazine | Imine | |
| 34 | (isoindole with CN, CONH-phenyl, N-NH₂) | (isoindole-benzothiazole with OC₂H₅) | orange |
| 35 | " | (isoindole with NC, CN, NH) | orange |
| 36 | (isoindole with NC, CONH₂, N-NH₂) | (isoindole with NC, benzimidazole) | red |
| 37 | " | (isoindole-benzothiazole with OC₂H₅) | red |
| 38 | " | (isoindole with NC, CONH-phenyl) | orange |
| 39 | (isoindole with NC, CONH-phenyl, N-NH₂) | (isoindole with NC, benzimidazole) | red |

-continued

| Example No. | Starting materials Hydrazine | Imine | Shade of resulting pigment |
|---|---|---|---|
| 40 | (structure: 1-hydrazino-3-(cyano-N-(3,4-dichlorophenyl)carbamoylmethylene)-isoindolenine) | (structure: cyano-N-phenylcarbamoylmethylene isoindoline-diimine) | orange |
| 41 | " | (structure: NC, CONH—CH₃ with isoindolenine) | orange |

EXAMPLE 42

(a) 12 g (0.033 mol) of 1-ethoxymethylenehydrazino-3-(cyano-N-phenylcarbamoylmethylene)-isoindolenine and 7.5 g (0.043 mol) of 1-phenyl-3-methylpyrazolone(-5) are heated in 150 ml of dimethylformamide at 110° C. for 3 hours and 15 minutes. The mixture is cooled to 60° C., the precipitate is filtered off with suction. After washing with dimethylformamide and methanol there are obtained 7.4 g (77,2% of theory) of a pigment which is identical to the pigment obtained in Example 1.

(b) If in Example 42(a) 1-phenyl-3-methyl-pyrazolone(-5) is replaced by equimolar amounts of malonic acid dinitrile or naphthindandione, the same pigment is obtained with a yield of 89.6% and 81.3%, respectively.

EXAMPLE 43

(a) 6.7 g (0.017 mol) of 1-ethoxymethylenehydrazino-3-(cyano-N-p-chlorophenylcarbamoylmethylene)-isoindolenine and 3.1 g of 1-phenyl-3-methyl-pyrazolone (-5) (0.018 mol) are heated in 80 ml of dimethylformamide for one hour to 110° C. After filtering off with suction, washing and drying there are obtained 3.9 g (70.9% of theory) of a red pigment which is identical to the pigment obtained in Example 4.

(b) If the same reaction is performed in 80 ml of dimethylsulfoxide instead of dimethylformamide there are obtained 2.9 g (52,9% of theory) of the same pigment.

EXAMPLE 44

5 g of 1-ethoxymethylenehydrazino-3-(cyano-N-phenylcarbamoylmethylene)-isoindolenine are heated in 80 ml of dimethylforamide and 1.7 ml of concentrated sulfuric acid to 130° C. and maintained at this temperature for 30 minutes. Thereafter the mixture is cooled to 60° C., filtered off with suction and the residue is washed with dimethylformamide, methanol and water. There are obtained 3.0 g (75% of theory) of a reddish orange pigment which is identical to the pigment obtained in Example 1.

EXAMPLE 45 (use example)

8 g of finely divided pigment of Example 1a are dispersed in 92 g of a stoving enamel of the following composition:
33% of alkyd resin
15% of melamine resin
5% of glycol monomethyl ester
34% of xylene
13% of butanol Suitable alkyd resins are products based on synthetic or vegetable fatty acids, such as coconut oil, castor oil, ricinene oil, linseed oil or the like. Urea resins can be used instead of melamine resins.

On completed dispersion the pigmented paint is applied to paper, glass or plastic sheeting or metal foils and baked thereon at 130° C. for 30 minutes. The coatings are very fast to light or weathering and have good over-lacquering fastness.

EXAMPLE 46 (use example)

0.2 g of pigment of Example 1a is mixed with 100 g of polyethylene, polypropylene or polystyrene granules. The mixture can either be directly moulded at 220° to 280° C. in an injection-moulding machine or be processed in an extruder into coloured rods or between mixing rolls into coloured sheets. The rods or sheets are granulated if appropriate and injected into an injection-moulding machine.

The orange mouldings have very good light and migration fastness. Synthetic polyamides of caprolactam or adipic acid and hexamethylenediamine or the condensates of terephthalic acid and ethylene glycol can be coloured in a similar manner at 280°–300° C., if necessary in an atmosphere of nitrogen.

EXAMPLE 47 (use example)

A printing ink prepared by grinding 35 g of pigment of Example 1a, 65 g of linseed oil and 1 g of a siccative (Co naphthenate, 50% strength in white spirit) gives orange offset prints of high brilliance and tinctorial strength and very good light and lacquering fastness properties. The use of this printing ink in letterpress, collotype or lithographic printing or die stamping gives orange prints of similar fastness properties. If the pigment is used to colour tin-plate or thin rotogravure printing inks, orange prints of similar fastness properties are obtained.

We claim:

1. Isoindolazines which, in one of their tautomeric structures, have the formula

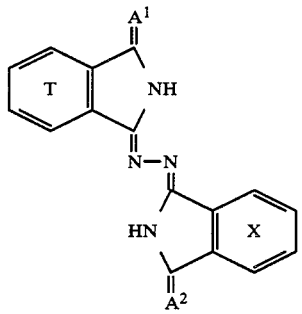 (I)

where
the rings designated X and T are unsubstituted or are substituted by 1,2,3 or 4 substituents selected from the group consisting of halogen, $C_1$–$C_6$-alkyl, $C_1$–$C_6$-alkoxy, carboxyl, nitro and carbamoyl and $A^1$ and $A^2$ represent the divalent radical of a compound having two replaceable hydrogen atoms on a C or N atom said radical being selected from the group consisting of the divalent radical of an amine, of a hydrazine, of a hydrazide, of a hydrazone or a divalent radical of the formulae

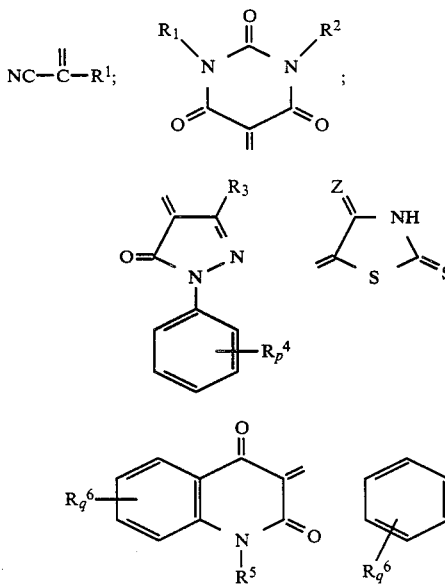

where $R^1$ designates cyano, $C_1$–$C_6$-alkoxy-$C_1$–$C_6$-alkoxycarbonyl, carbamoyl which is optionally substituted by $C_1$–$C_6$-alkyl, benzyl, naphthyl or phenyl, where phenyl, benzyl and naphthyl can be substituted by chlorine, bromine, $C_1$–$C_6$-alkyl, $C_1$–$C_6$-alkoxy, nitro, trifluoromethyl, $C_1$–$C_6$-alkylcarbonyl, cyano, $C_1$–$C_6$-alkylamino, benzylamino, phthalimidyl or carbamoyl, $C_1$–$C_6$-alkylcarbonyl, benzoyl, $C_1$–$C_6$-alkoxycarbonyl, benzyloxycarbonyl, phenoxycarbonyl, where benzoyl, benzyl and phenoxy can be substituted by halogen, nitro, $C_1$–$C_6$-alkyl, acylamino or phthalimidyl, phenyl which is optionally substituted by halogen, nitro, cyano or trifluoromethyl, or a heterocyclic radical of the formula

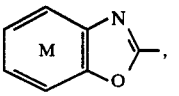

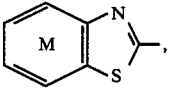

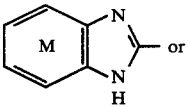

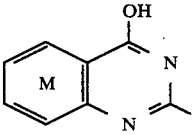

where
the rings designated M can be substituted by halogen, nitro, $C_1$–$C_6$-alkyl or $C_1$–$C_6$-alkoxy, $R_1$ and $R^2$ designate hydrogen, $C_1$–$C_6$-alkyl, phenyl which is optionally substituted by halogen, $C_1$–$C_6$-alkyl, $C_1$–$C_6$-alkoxy or nitro, or α- or β-naphthyl, $R^3$ represents $C_1$–$C_6$-alkyl, amino, $C_1$–$C_6$-alkylcarbonyl, carbamoyl or $C_1$–$C_6$-alkoxycarbonyl, $R^4$ represents $C_1$–$C_6$-alkyl, $C_1$–$C_6$-alkoxy, halogen or nitro, p designates 0, 1 or 2, Z designates O or S, $R^5$ designates hydrogen or $C_1$–$C_6$-alkyl, $R^6$ designates halogen or nitro and q designates 0, 1, 2, 3 or 4.

2. Compounds according to claim 1, where $A^1$ and/or $A^2$ represent a radical >N—$R^7$ in which $R^7$ represents a phenyl radical which is optionally a most trisubstituted by halogen, nitro, cyano, carbamoyl, trifluoromethyl, phthalimidyl, $C_1$–$C_6$-alkylcarbonylamino or benzoylamino which in turn can be further substituted by chlorine, $C_1$–$C_6$-alkyl, or nitro, alpha- or beta-naphthyl, or a radical of the formula

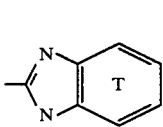

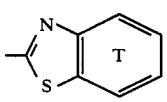

or

-continued

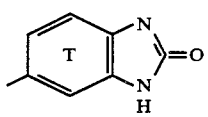

where the rings designated T are unsubstituted or are substituted by 1, 2, 3 or 4 substituents selected from the group consisting of halogen, $C_1$–$C_6$-alkyl, $C_1$–$C_6$-alkoxy, carboxyl, nitro and carbamoyl.

3. Compounds according to claim 1 where $A^1$ and/or $A^2$ represent a radical of the formula

where $R^7$ represents a phenyl radical which is optionally at most trisubstituted by halogen, nitro, cyano, carbamoyl, trifluoromethyl, phthalimidyl, $C_1$–$C_6$-alkylcarbonylamino or benzoylamino which in turn can be further substituted by chlorine, $C_1$–$C_6$-alkyl, or nitro, alpha- or beta-naphthyl, or a radical of the formula

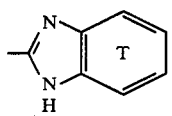

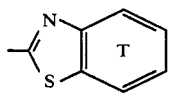

or

-continued

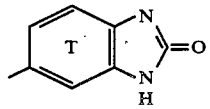

where the rings designated T are unsubstituted or are substituted by 1, 2, 3 or 4 substituents selected from the group consisting of halogen, $C_1$–$C_6$-alkyl, $C_1$–$C_6$-alkoxy, carboxyl, nitro and carbamoyl.

4. Compounds according to claim 1, where $A^1$ and/or $A^2$ represent a radical of the formula

where $R^8$ designates $C_1$–$C_6$-alkylcarbonyl or benzoyl which is optionally substituted by halogen, nitro, cyano, carbamoyl, $C_1$–$C_6$-alkylcarbonylamino, or phthalimidyl.

5. Compounds according to claim 1, where $A^1$ and/or $A^2$ represents a radical of the formula

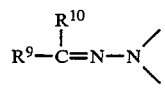

in which
$R^9$ represents hydrogen or $C_1$–$C_6$-alkyl and
$R^{10}$ represents phenyl which is optionally substituted by chlorine, nitro, $C_1$–$C_6$-alkyl, $C_1$–$C_6$-alkylcarbonylamino, acetyl, phthalimidyl, cyano, carbamoyl or trifluoromethyl or a heterocyclic radical of the formula

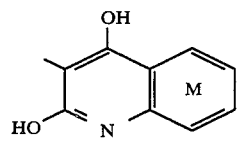

in which the ring designated M can be substituted by halogen, nitro, $C_1$–$C_6$-alkyl or $C_1$–$C_6$-alkoxy.

* * * * *